United States Patent
Droege et al.

(10) Patent No.: US 7,520,686 B2
(45) Date of Patent: Apr. 21, 2009

(54) MODULAR INSTALLATION CONCEPT FOR A CAMERA

(75) Inventors: Frank Droege, Hamburg (DE);
Burghard Wussow, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 300 days.

(21) Appl. No.: 11/379,504

(22) Filed: Apr. 20, 2006

(65) Prior Publication Data
US 2007/0172227 A1    Jul. 26, 2007

Related U.S. Application Data

(60) Provisional application No. 60/673,058, filed on Apr. 20, 2005.

(30) Foreign Application Priority Data
Apr. 20, 2005    (DE) ................ 10 2005 018 316

(51) Int. Cl.
G03B 17/00    (2006.01)
H04N 7/18    (2006.01)

(52) U.S. Cl. .............. 396/427; 348/143; 348/148

(58) Field of Classification Search .......... 396/419, 396/427, 428, 535, 661, 643, 644; 348/143, 348/144, 151; 248/140, 221.11, 221.13, 248/222.14, 221.51, 222.52, 681; 296/100.06
See application file for complete search history.

(56) References Cited

U.S. PATENT DOCUMENTS 2,225,722 A * 12/1940 Spieth .................. 237/79
6,824,317 B2    11/2004 Finizio et al.
2002/0101041 A1    8/2002 Kameyama
2003/0095800 A1 *    5/2003 Finizio et al. ............. 396/427
2004/0120702 A1 *    6/2004 Ford ........................ 396/427

FOREIGN PATENT DOCUMENTS

DE    29720019 U1    11/2004
WO    2004023608 A1    3/2004

* cited by examiner

Primary Examiner—W. B. Perkey
Assistant Examiner—Minh Phan
(74) Attorney, Agent, or Firm—Christopher Paradies; Fowler White Boggs P.A.

(57) ABSTRACT

A modular installation system for the installation of camera provides an installation kit capable of being used either flush mounted or protruding on the wall of an aircraft cabin. An external mounting housing or a mounting frame may be used. A camera module includes a camera and mounting hardware including a latching mechanism. The camera module may be arranged substantially in front of the installation wall or substantially flush with the installation wall using the same latching mechanism of the camera module. An external housing may be used for housing the camera module such that the external housing mounts on a surface of a wall or partially inserted into a wall, and the external housing provides latching hardware for mating with the latching mechanism of the camera module. A mounting frame may be inserted in a wall cutout to provide latching hardware for mating with the latching mechanism of the camera module for substantially flush mounting. An external frame may be removably fitted onto the camera module.

9 Claims, 6 Drawing Sheets

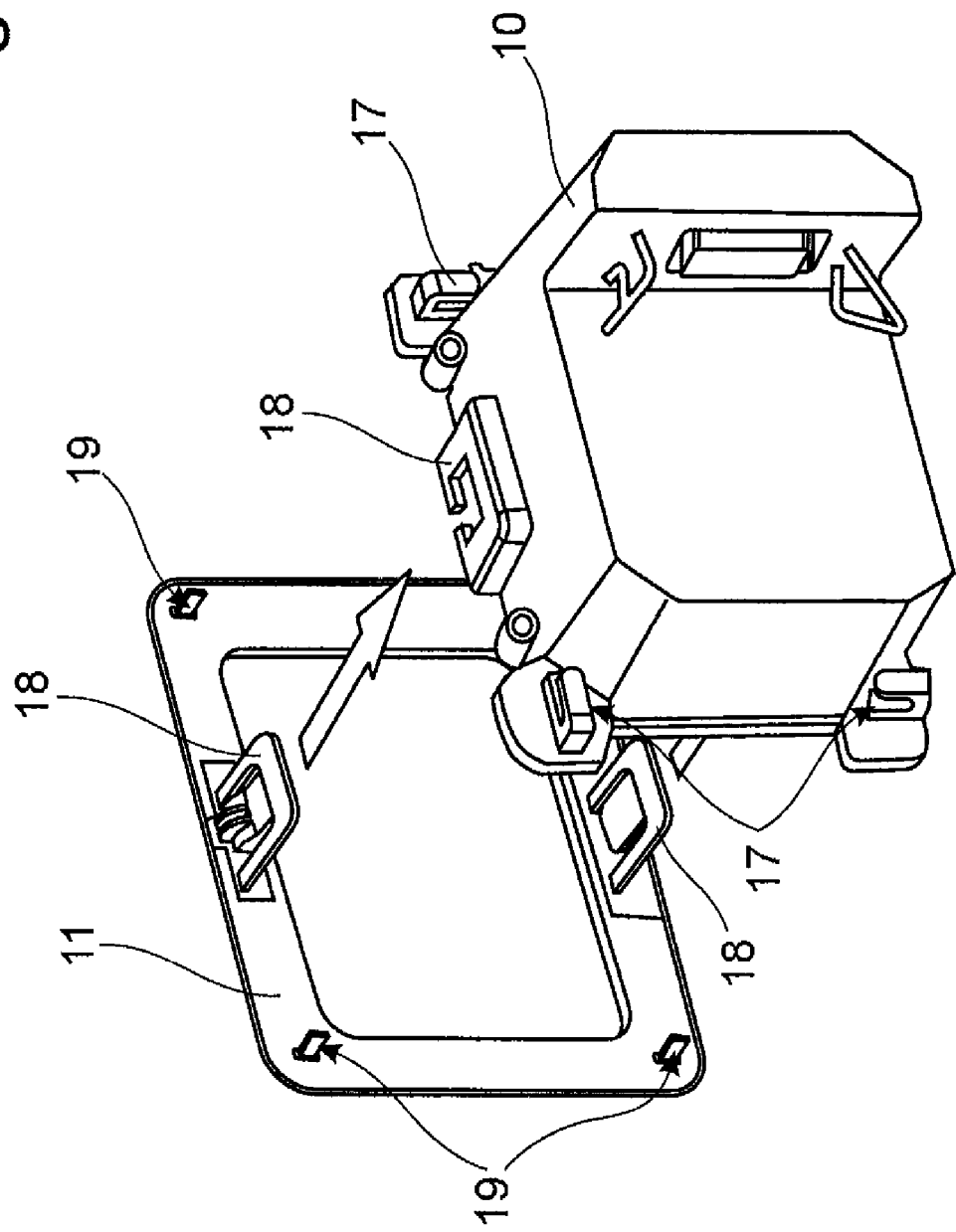

MODULAR INSTALLATION CONCEPT FOR A CAMERA

REFERENCE TO RELATED APPLICATIONS

This application claims the benefit of the filing date of German Patent Application No. 10 2005 018 316.6 filed Apr. 20, 2005 and of U.S. Provisional Patent Application No. 60/673,058 filed Apr. 20, 2005, the disclosure of which applications is hereby incorporated herein by reference.

FIELD OF THE INVENTION

The present invention generally relates to the installation of surveillance cameras in an aircraft. The present invention specifically relates to a modular installation concept for installation of cameras, wherein different camera installation positions can be realized due to the utilization of a new installation kit. The invention furthermore relates to a camera module for installation on an installation wall of an aircraft. In addition, the invention pertains to the utilization of an external mounting housing for installing a camera module in an aircraft, as well as to an aircraft with at least one such camera module.

TECHNOLOGICAL BACKGROUND

The events that took place on Sep. 11, 2001 in the United States of America, as well as the resulting fear of other aircraft hijackings, resulted in the passenger cabin(s) as well as the cockpit of more and more aircraft being equipped with surveillance cameras in order to continuously obtain information on the events taking place in the aircraft. Surveillance cameras of this type were installed, in particular, in the region of the entry doors of the aircraft as well as for monitoring the entry door of the cockpit.

Due to the lack of suitable cameras and camera housings, conventional and commercially available cameras were initially utilized, wherein these cameras were installed into the housing of a reading lamp of the type that was thus far used in the cabin ceiling only. These reading light housings were then installed in the cabin ceiling and in front of the cockpit door for quite some time, namely by means of a complicated mounting and adapter construction. However, reading light housings were generally not integrated into vertical surfaces (such as, e.g., galleys, lavatories, partition walls, etc.), but into ceiling areas only for reasons of cabin design. It goes without saying that a reading light housing is neither designed for accommodating a camera nor for being installed at an arbitrary location in an aircraft cabin such that this construction is associated with a variety of undesirable side-effects, for example, a significant installation depth of the camera housing as well as the substantial installation expenditure for the housing, in which the above-described mounting and adapter constructions were utilized.

However, the reading light housings may only be installed at such locations of the inside paneling, at which the installation depth behind the inside paneling is sufficient for accommodating the relatively deep reading light housing. Furthermore, a special connection and adapter construction may need to be designed and manufactured depending on the type and the design of the inside paneling in order to install the reading light housing with the camera into the inside paneling.

SUMMARY OF THE INVENTION

According to an embodiment of the present invention, a camera installation kit for realizing different camera installation positions may be provided. Furthermore, a camera module for the installation on an installation wall of an aircraft, a utilization of an external mounting housing for installation of a camera module in an aircraft, as well as an aircraft with at least one specially designed camera module may be provided.

The camera installation kit of the present invention for realizing different installation positions of a camera in an aircraft comprises a camera module that, in turn, is equipped with a latching mechanism, wherein said latching mechanism is arranged on a housing that surrounds the camera module. The installation kit furthermore comprises an external mounting housing for the camera module that can be mounted on an installation wall such as, for example, a ceiling, a lining or, in general, an inside paneling of an aircraft. The camera module is designed for being latched in an installation cutout in the external mounting housing by means of the latching mechanism in order to realize a protruding installation position, in which the camera module is arranged substantially in front of the installation wall. Alternatively, the design of the camera module may also make it possible to realize a flush installation position, in which the camera module is latched in an installation cutout in the installation wall by means of the latching mechanism such that the camera module is arranged substantially behind the installation wall.

This may provide an installation concept that allows installation of a surveillance camera at practically arbitrary locations in an aircraft and requires minimal construction and installation expenditure.

The installation kit according to an embodiment of the present invention for a camera may therefore allow a highly flexible installation of a surveillance camera at practically arbitrary locations of an aircraft passenger cabin. Due to the utilization of the installation kit according to an embodiment of the present invention, the installation of a camera may no longer be restricted to the locations of an aircraft, at which a sufficient installation depth is available behind the inside paneling. On the contrary, the utilization of the installation kit and, in particular, the utilization of the external mounting housing may make it possible to arrange the camera in regions of a passenger cabin or a cockpit, in which sufficient installation space for accommodating the camera is not available. For example, the camera module may be arranged on arbitrary surfaces, behind which no or only a slight installation depth is concealed, by utilizing the external mounting housing. In instances in which, for example, the inside paneling of the passenger cabin is only spaced apart from the outside construction of the aircraft fuselage by a very short distance, the external mounting housing, into which the camera module is subsequently installed, can be arranged, for example, on the inside paneling that forms the installation wall. In order to utilize the installation depth behind the inside paneling regardless of its size, the external mounting housing may have such a depth that the camera is partially accommodated in the external mounting housing and partially accommodated behind the installation wall. If the external mounting housing has a very small depth, this may result in the camera module extending into the installation wall through an installation cutout such that it is arranged substantially behind the installation wall. However, if the external mounting housing has a substantial depth, this may result in the camera module being arranged substantially in front of the installation wall such that no installation depth is required behind the installation wall for accommodating the camera body.

Naturally, the external mounting housing of the installation kit according to an embodiment of the present invention may need to be available in different depths, shapes and sizes to allow the fitting of a variety of camera modules.

One advantage of an installation kit according to an embodiment of the present invention is that the installation of a camera in an aircraft is not restricted to regions in which a sufficient installation depth is available for the camera module. On the contrary, surveillance cameras may be arranged at arbitrary locations in a passenger cabin. The invention may also eliminate the significant installation expenditure associated with the initially described known installation concept, in which a reading lamp housing is utilized. The special mounting and adapter components that may have been required for the installation of a reading light housing may also be eliminated. A camera module may now be latched in either a suitable installation cutout in an installation wall or in a correspondingly realized installation cutout in the external mounting housing by utilizing the latching mechanism arranged thereon, i.e., no additional fastening means may be required.

In order to prevent the camera module from falling out of the installation cutout in the external mounting housing or the installation wall after its installation into the respective installation cutout, the camera module comprises a plurality of latching elements for latching the camera module in either the installation cutout in the installation wall or, alternatively, in the installation cutout in the external mounting housing. The camera housing of the camera module may furthermore feature at least one abutment surface that is suitable for contacting the outside of the installation cutout in order to thusly secure the camera module from falling into the installation cutout. The camera module therefore is secured by the at least one abutment surface in the installation direction and by the plurality of latching elements opposite to the installation direction such that the camera module is prevented from undesirably shifting from the installation position. Alternatively to securing the installation position of the camera module with the described combination of abutment surface and latching element, the latching elements may, according to another embodiment, be pivoted into corresponding recesses in the installation cutout in order to ensure that the camera module is secured in position.

The latching elements are arranged on the camera module such that they may be pivoted between a latching position and an unlatching position in order to achieve a simple latching process with the aid of the latching elements. The latching elements consequently may be realized in the form of simple latches that can be pivoted back and forth between two positions, for example, with the aid of a screwdriver, wherein the two positions are preferably offset relative to one another by an angle of 90°.

In order to ensure an optimal seat of the camera module in its installation position, in which the camera module may be latched in an installation cutout in the installation wall, the installation kit may furthermore comprise an installation frame that serves for latching the camera module in the installation cutout in the installation wall during its installation. This installation frame is initially fitted into the installation cutout in the installation wall in order to compensate a possibly inaccurate contour of the installation cutout. The utilization of an installation frame that has the same inside contour as the installation cutout in the external mounting housing may make it possible to ensure that any dimensional inaccuracies in producing the installation cutout in the installation wall are compensated.

The modularity of the installation kit according to an embodiment of the present invention may furthermore be ensured in that the installation cutout in the external mounting housing and the installation frame respectively feature an opening in the installation direction that forms a seat for the camera module. This identical seat not only refers to the above-described installation cutout in the installation wall and in the external mounting housing; on the contrary, the seat refers to the strictly prescribed three-dimensional contour measurements in the region of the opening that are required for fixing the camera module in identical positions in the external mounting housing and in the installation frame. For example, stopping or sliding surfaces in the region of the opening would have to be categorized as a seat thereof for the camera module. In other words, the seat includes all contour measurements of the external mounting housing and the installation frame that are responsible for the camera module assuming a defined position relative to the external mounting housing and the installation frame, respectively.

These seat-forming contour surfaces may need to be distinguished from the contours that serve for fixing the camera module in the installation housing or in the installation cutout in the installation wall together with the latching elements. For example, the external mounting housing as well as the installation frame may comprise a plurality of latching cams that are respectively arranged in such a way that the latching elements are, after having been pivoted, positively engaged with the latching cams in order to prevent the camera module from falling out of the respective installation cutout as mentioned above. In this case, the latching cams need to be arranged in such a way that the latching elements are nested behind the latching cams due to the pivoting movement and the latching cams in connection with the latching elements generate a resistance opposite to the installation direction that prevents the camera module from falling out of the respective installation cutout.

In order to protect the front side of the camera module and, in particular, the camera lens, the installation kit furthermore comprises a front cover that may be arranged on the front side of the camera module. In this case, the front cover is provided with a glass featuring a reflective metal coating in order to render the camera invisible to the passenger. The front cover may feature a plurality of safety pins that, when the front cover is attached to the camera module, are located in positions in which they prevent the latching elements from being pivoted from their latching position into the unlatching position. This unlatching safety is advantageous in that the aircraft is subjected to various types of vibrations in-flight and even if the engines are merely running at idle speed, wherein said vibrations may cause the latching elements to disengage from the latched position such that the camera module may fall out of the installation cutout.

According to another aspect of the present invention, an external mounting housing for installing a camera module in an aircraft may be utilized, particularly in a passenger cabin or a cockpit, wherein the external mounting housing serves for latching a camera module with a latching mechanism that is arranged substantially behind an installation surface and can be latched in the external mounting housing by means of the latching mechanism in order to realize a flush installation position in the external mounting housing by means of the latching mechanism in order to realize a protruding installation position, in which the camera module is arranged substantially in front of the installation surface. The external mounting housing itself may be realized as described above with reference to the inventive installation kit.

According to yet another aspect, an aircraft that comprises at least one camera module featuring a latching mechanism may be provided. In this case, the camera module is designed for being latched by means of the latching mechanism in an installation cutout in an external mounting housing with the above-described characteristics that can be mounted on an installation wall, namely such that the camera module is arranged substantially in front of the installation wall. Alternatively, the camera module is designed for being latched in an installation cutout in the installation wall by means of the latching mechanism such that the camera module is arranged substantially behind the installation wall.

Finally, a camera module for being installed on an installation wall of an aircraft may be provided, wherein said camera module features a camera housing, on which at least one latching element is arranged such that it can be pivoted between a latching position and an unlatching position, and wherein the at least one latching element is designed for latching the camera module in an installation cutout in its latching position, namely such that the camera module is secured from falling out. This installation cutout may be located, for example, in an installation wall of an aircraft or a separate external mounting housing as described above, wherein it is merely important that the respective installation cutout has matching contour surfaces and measurements.

In order to ensure that the camera housing is securely positioned relative to the installation cutout, the camera housing features at least one abutment surface that is arranged such that it contacts the outside of the installation cutout so as to secure the camera module from falling into the installation cutout. In the installed state, a section of the installation cutout such as, for example, a latching cam is therefore situated between the at least one abutment surface and one of the latching elements such that the camera module is securely positioned in the installation cutout.

The previous description should have elucidated the idea of the invention that consists of developing an installation concept for a camera module that, depending on the installation position, may be arranged at different locations of an aircraft individually or in connection with an external mounting housing, namely without having to specially adapt the camera module to the respective situation at the installation point.

DESCRIPTION OF THE DRAWING

The present invention is described in greater detail below with reference to the drawings and examples of the present invention:

FIG. 6 shows yet another perspective exploded view of an installation kit without an external mounting housing, however, in the form of a rear view.

Identical or similar components are identified by the same reference symbols in all figures.

DETAILED DESCRIPTION OF AN EMBODIMENT OF THE INVENTION

Figure 1:
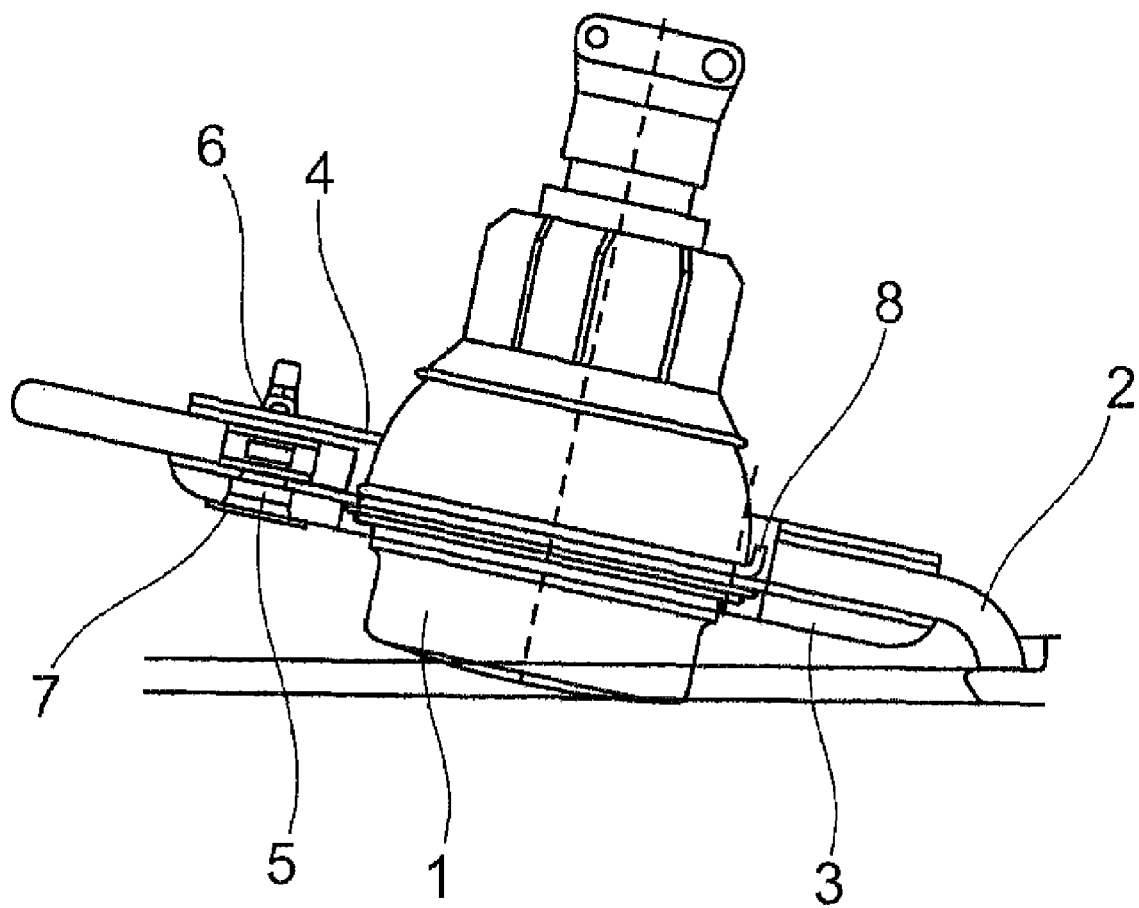
FIG. 1 shows a section through a conventional camera installation principle.

A known camera installation principle for a surveillance camera is initially described with reference to FIG. 1 in order to better elucidate the invention and to emphasize its advantages in comparison with a known camera installation principle. According to this figure, a camera that is not visibly illustrated in this figure is arranged in a housing 1 that normally serves as a housing for a reading lamp. This reading light housing 1 containing the camera is mounted in the ceiling 2 of an aircraft passenger cabin. An adapter ring 3 is screwed into and forms the border of an opening in the ceiling 2 in order to accommodate the reading light housing 1. This adapter ring 3 serves for solidly and positively accommodating the reading light housing 1 in the opening in the ceiling 2 in connection with another ring 8 extending around the reading light housing 1, as well as an inner fastening ring 4. In order to fix the reading light housing with the camera accommodated therein in the thusly created seat, fastening screws 5 are inserted through the adapter ring 3 and through the inner fastening ring 4 and secured with a cage nut 6 such that all of the described components are clamped together and the reading light housing is fixed in position. Covering caps 7 are subsequently arranged in front of the fastening screws 5 in order to optically conceal the screws 5.

According to the description of this known installation principle for a camera, a variety of different components that are specially suited for this particular installation situation is required for mounting the known reading light housing in the ceiling 2. FIG. 1 also shows that the reading light housing 1 has a significant (structural) depth such that it can only be used at locations of a ceiling 2 or a corresponding inside paneling, at which the installation depth between the ceiling 2 and the outside construction of the aircraft fuselage is sufficiently large.

Figure 2:
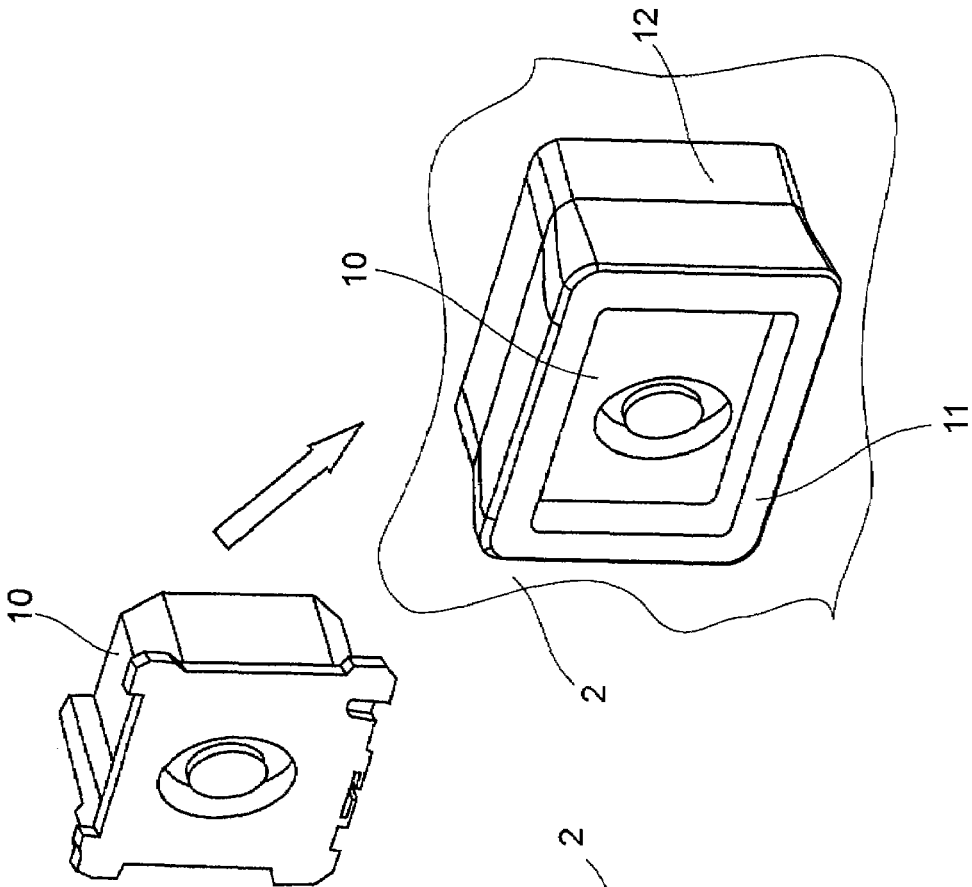
FIG. 2 shows one of the basic principles according to the invention.

In order to eliminate this construction and installation expenditure that is required for the variety of different fastening elements, as well as the dependence on predetermined installation depths, the present invention proposes a substantially shallower camera module 10 in FIG. 2A that is specially designed for being installed in either a flush position of FIG. 2B or in a protruding position of FIG. 2C. In the flush position of FIG. 2B, the camera module 10 is arranged substantially behind the ceiling 2 or the installation wall 2. In the protruding installation position of FIG. 2C, the camera module 10 is arranged substantially in front of the installation wall 2. A camera module 10 may be substantially flush with the installation wall 2 in the flush position and is covered by a front cover 11 that serves for protecting the camera module 10 and, in particular, its lens. The camera module 10 is also protected by a front cover 11 in the protruding position (right illustration of FIG. 2). However, the camera module 10 is not directly installed in the installation wall 2 in this position, but rather mounted in an external mounting housing 12 that, in turn, is mounted on the installation wall 2.

This installation of the camera module 10 into the external mounting housing 13 is described in greater detail below with reference to FIGS. 3 and 4. An installation kit for a camera that serves for realizing different camera installation positions comprises a camera module 10 as well as an external mounting housing 12. The external mounting housing 12 features four latching pins on its rear side, wherein said latching pins serve for fixing the external mounting housing in corresponding bores or openings in the installation wall 2. These latching pins may be realized, for example, in the form of screws and fixed in the bores in the form of a screw connection. The latching pins may also consist, for example, of rapid-action fasteners that can be latched in the bores by means of a pivoting mechanism. On its front side, the external mounting housing 12 contains an opening suitable for accommodating the camera module 12. In order to safely insert the camera module 12 into the external mounting housing 12 and to fix the camera module therein in a defined position, the external mounting housing 12 features a plurality of sliding and abutment surfaces 13, 14 for ensuring that the camera module 12 is accommodated in an optimally fitted fashion. The corners on the front side of the camera module 10 also feature corresponding abutment surfaces 15 that are arranged such that they come in contact with the abutment surfaces 14 of the external mounting housing 12 in the installed position. FIG. 4, in particular, shows four latching elements 17 on the corners of the camera module 10 that can be pivoted back and forth between an unlatching position and a latching position (see turning arrow in FIG. 3). For example, the upper right and the lower left latching element 17 are in an unlatching position in FIG. 4 while the latching element 7 on the upper left is in a latching position.

Figure 3:
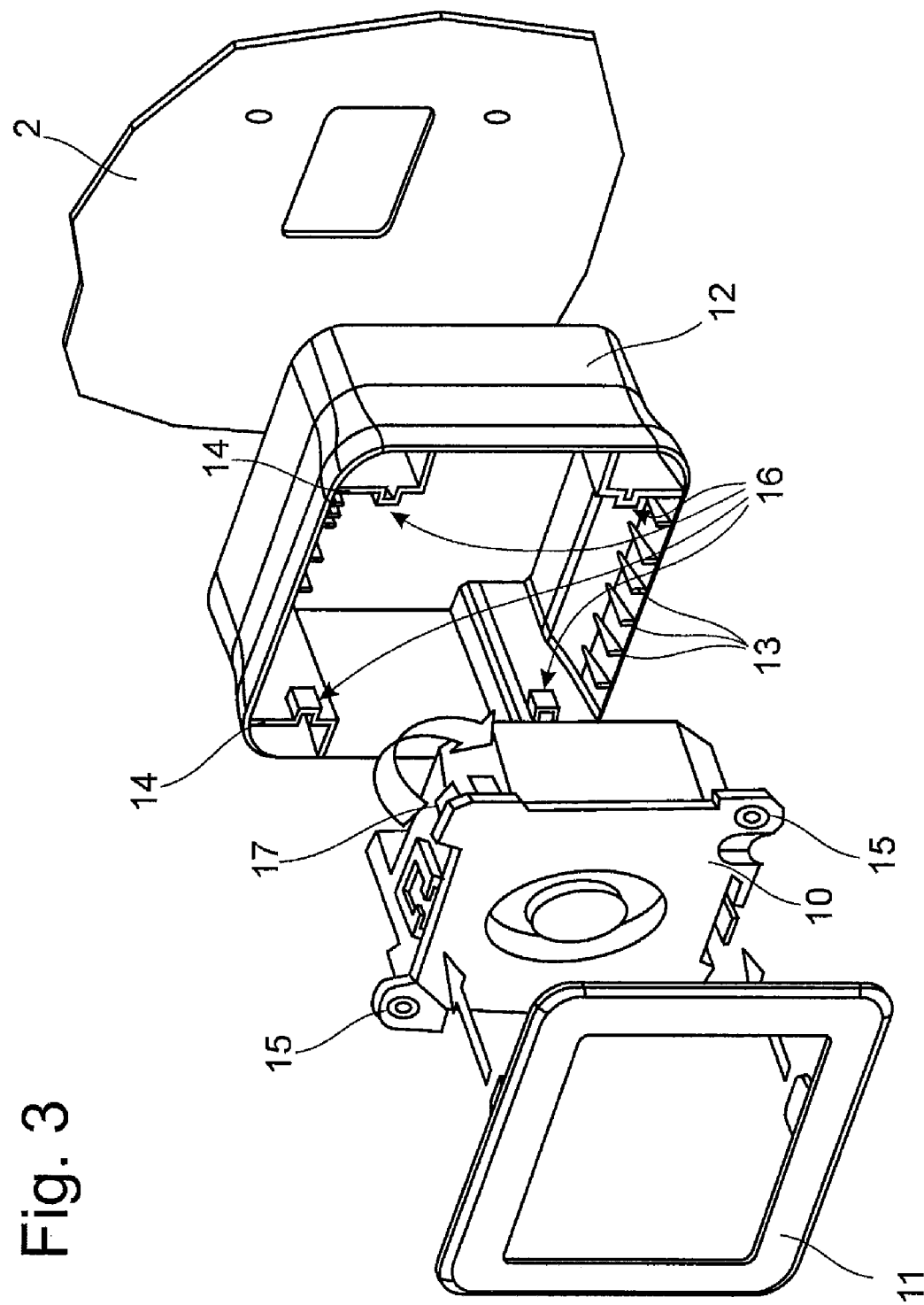
FIG. 3 shows a perspective exploded view of an installation kit according to the invention with an external mounting housing.
Figure 4:
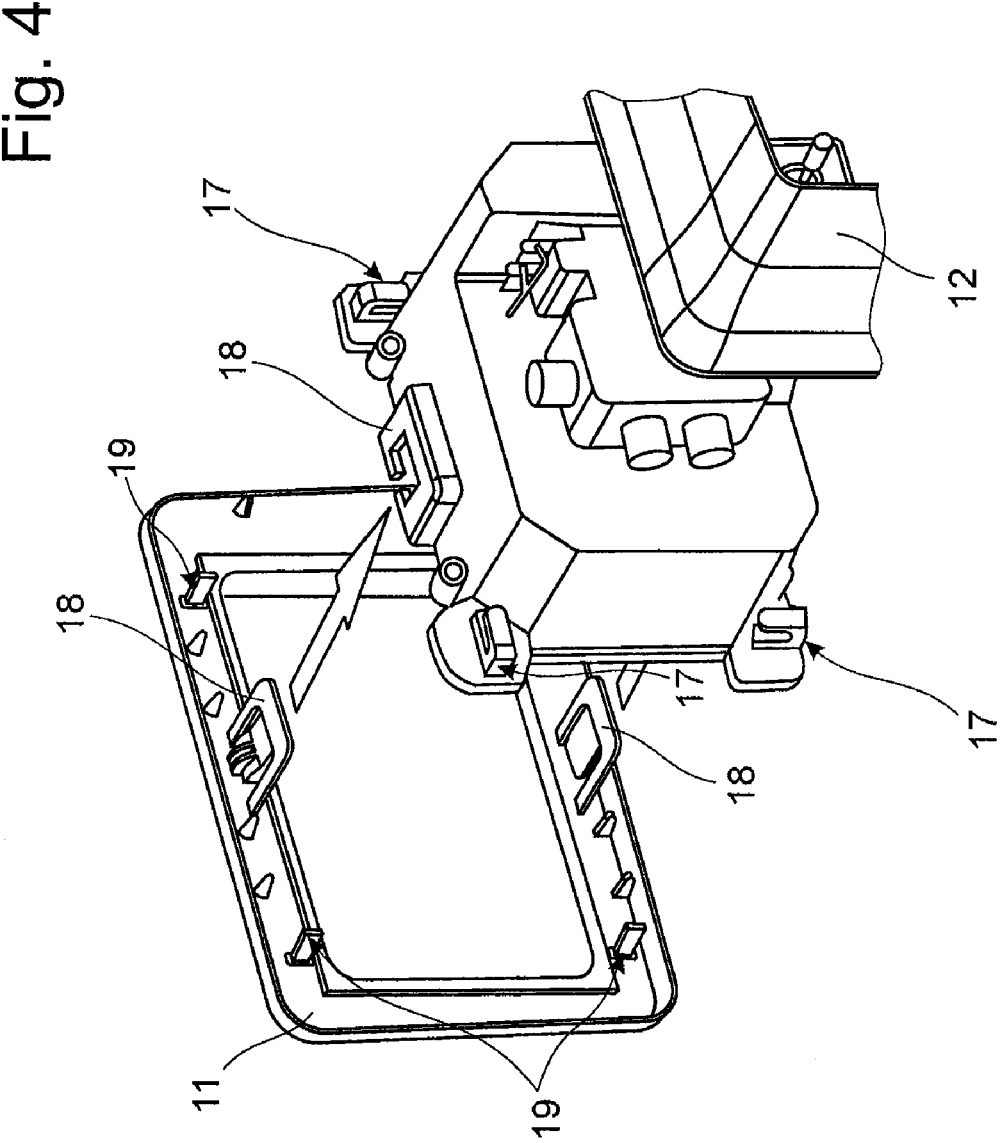
FIG. 4 shows another perspective exploded view of an installation kit in a rear view.

These designations of the latch positions are elucidated in FIG. 3, in which the four latching elements 17 are situated directly on so-called latching cams 16 of the external mounting housing 12 when the camera module is installed into the external mounting housing 12. In order to make it possible to insert the camera module 10 into the external mounting housing 12 in the installation direction from the front side, all four latching elements 17 need to be in their unlatching position, i.e., in their upper position, so as to prevent collisions with the latching cams 16. As soon as the camera module 10 is inserted into the external mounting housing 12 from the front side and fitted therein, the latching elements are turned from their unlatching position (top) into their latching position (on the side), for example, with the aid of a screwdriver. When the latching elements 17 are in their latching position, they lie behind the cams 16—referred to the installation direction—such that the camera module 10 is prevented from falling out of the external mounting housing 12.

In order to protect the front side of the camera module 10 from being damaged and visible, the installation kit comprises a front cover 11 that can be fixed on the camera module 10 by means of a plug-type connection 18. According to the rear view shown in FIG. 4, the rear side of the front cover 11 comprises four safety pins 19 that prevent the latching elements 17 from pivoting out of their latching position in the attached state of the front cover 11.

Figure 5:
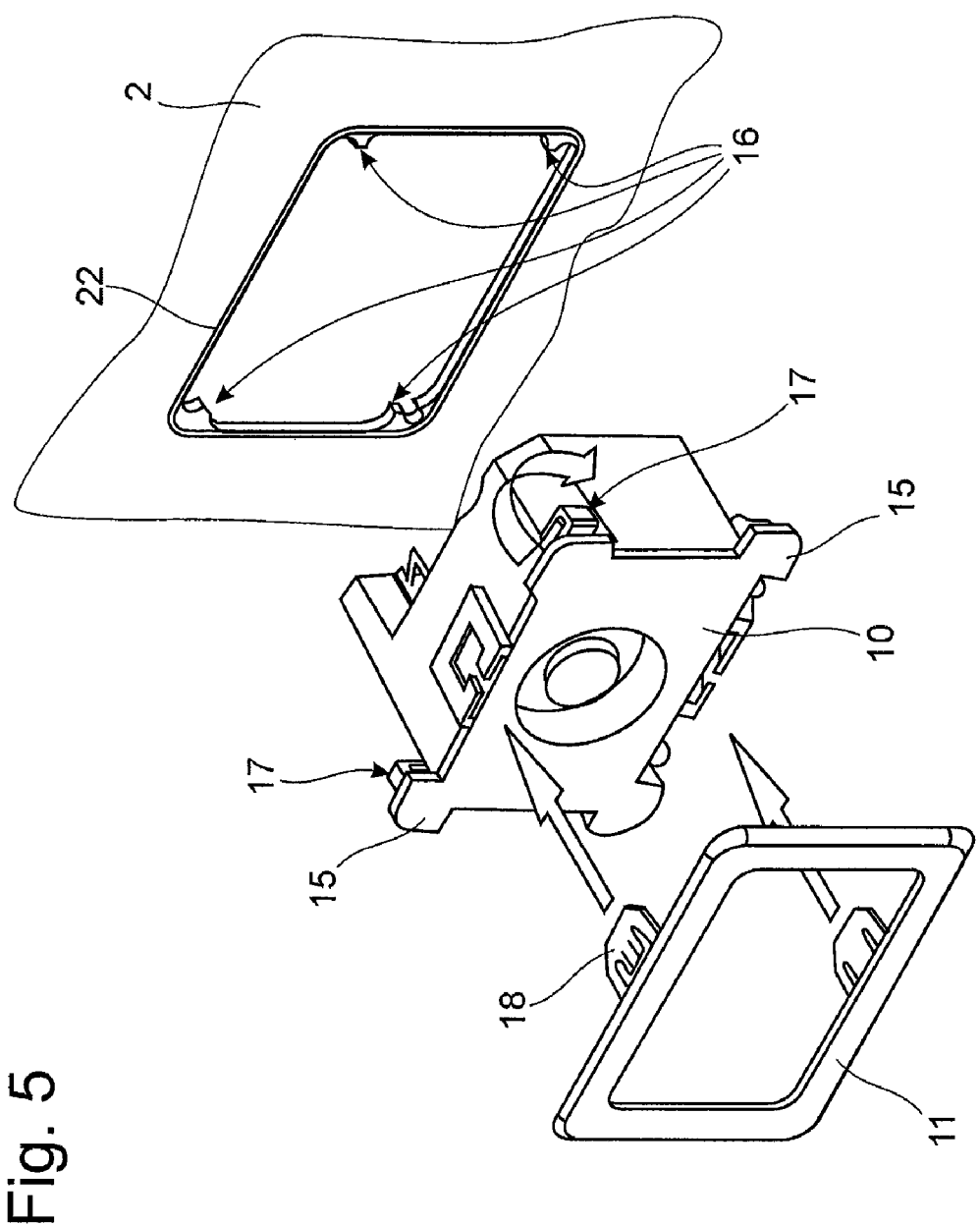
FIG. 5 shows another perspective view of a portion of an installation kit.

An exploded view of the an installation kit shown in FIG. 5 that is similar to the illustration shown in FIG. 3, except that the camera module 10 is not indirectly mounted on the installation wall 2 by means of the external mounting housing 12. Instead, the installation wall 2 features an installation cutout that—viewed from the front—corresponds to the cutout in the external mounting housing 12 in FIG. 3, with respect to the position of the latching cams 16. Consequently, the camera module 12 may be fitted into the installation cutout in the installation wall 2 when the latching elements 17 of the camera module 10 are in their unlatching position. As soon as the camera module 10 is fitted into the installation cutout in the installation wall 2, the latching elements 17 may be pivoted into their latching position such as by using a screwdriver or the like, such that the latching elements 17 lie—referred to the installation direction—behind the latching cams 16 securing camera module 10 from falling out of the installation cutout. In this case, the abutment surfaces 15 of the camera module 10 may serve for contacting a corresponding abutment surface formed by the installation wall 2 in order to ensure a defined position of the camera module 10 relative to the installation cutout.

An installation frame 22 may be initially fitted into the installation cutout, the installation frame may be provided with inwardly projecting latching cams 16 on the inside. One advantage of using an installation frame 22 is that dimensional inaccuracies of the cutout in the wall 2 may be accommodated.

Due to the special design of the camera module 10 as well as the option of utilizing an intermediate external mounting housing 12 for the installation of the camera module 10 into or on an installation wall 2, the camera module 10 may be installed at practically any location of an aircraft or an aircraft passenger cabin, respectively. Since the camera module 10 also features a specially designed latching mechanism, it is no longer required to install the camera with the aid of a variety of different fastening elements. The complete camera module may now be easily inserted into a corresponding installation cutout that may be arranged in either an installation wall 2 or an external mounting housing 12 and latched therein in order to complete the mechanical installation.

REFERENCE LIST

1 Reading light housing
2 Ceiling, paneling, lining
3 Adapter ring
4 Inner fastening ring
5 Fastening screw
6 Cage nut
7 Covering cap
8 Housing fastening ring
10 Camera module
11 Front cover
12 External mounting housing
13 Sliding surface
14 Abutment surface
15 Abutment surface
16 Latching cam
17 Latching element
19 Safety pin
22 Installation frame

What is claimed is:

1. An installation kit for a camera for providing different camera installation positions, the installation kit comprising:
 a camera module including a front side and a latching mechanism, the latching mechanism comprising a plurality of latching elements, the plurality of latching elements extending from the camera module and pivoting between a latching position and an unlatching position;
 a front cover attachable to the front side of the camera module, the front cover including a plurality of pins engaging the plurality of latching elements such that the pins prevent the plurality of latching elements from pivoting out of the latching position, when the front cover is attached to the front side of the camera module; and
 a mounting housing having an installation cutout for the camera module for mounting on an installation wall, wherein the camera module is capable of being latched in the installation cutout of the mounting housing using the latching mechanism such that the camera module is arranged in the mounting housing substantially in front of the installation wall or the camera module is flush mounted through a cutout in the installation wall.

2. The installation kit of claim 1, wherein the camera module further comprises at least one abutment surface such that the at least one abutment surface makes physical contact at an outer edge portion of the installation cutout, stopping the camera module and securing the camera module from passing through the installation cutout.

3. The installation kit of claim 1, further comprising an installation frame for latching the camera module in position when the camera module is flush mounted in the installation wall.

4. The installation kit of claim 3, wherein the installation cutout of the mounting housing and the installation frame comprise an opening that forms a seat for the camera module.

5. The installation kit of claim 4, wherein the mounting housing and the installation frame each comprise a plurality of latching cams; and the latching cams are arranged such that the latching elements are positively engaged with the latching cams after a pivoting movement to the latching position.

6. An aircraft comprising the installation kit of claim 1.

7. A camera module comprising a camera housing mounted in the installation kit of claim 1.

8. The camera module of claim 7, wherein the camera housing comprises at least one abutment surface that is suitable for contacting the outside of the installation cutout so as to secure the camera module from falling into the installation cutout.

9. A method for installing a camera module using the installation kit of claim 1, comprising:

selecting an installation surface for mounting of the camera module such that a camera supported in the camera module is directed toward a desired field of view;

determining a thickness of the installation surface and a gap behind the installation surface;

selecting from installation hardware in the installation kit for either flush mounting the camera module through a cutout in the installation wall or mounting the camera module in the mounting housing substantially in front of the installation wall;

preparing the installation wall for mounting of the hardware and camera module;

inserting the camera module in the mounting hardware until an abutment surface of the camera module contacts an edge portion of the mounting housing;

pivoting at least one of the plurality of latching elements of the latching mechanism in the installation cutout in the mounting housing securing the camera module from falling; and engaging the at least one of the plurality of latching elements with at least one of the plurality of pins of the front cover, preventing the at least one of the plurality of latching elements from pivoting out of the latching position.

* * * * *